United States Patent [19]
Umstadter et al.

[11] Patent Number: 5,606,588
[45] Date of Patent: Feb. 25, 1997

[54] METHOD AND APPARATUS FOR GENERATING LASER PLASMA X-RAYS

[75] Inventors: Donald Umstadter; Jonathan Workman; Anatoly Maksimchuk; Xinbing Liu, all of Ann Arbor, Mich.

[73] Assignee: The Regents of the University of Michigan, Ann Arbor, Mich.

[21] Appl. No.: 508,482

[22] Filed: Jul. 28, 1995

[51] Int. Cl.[6] .................................................. H01J 35/22
[52] U.S. Cl. ............................................ 378/119; 378/122
[58] Field of Search ....................................... 378/119, 122

[56] References Cited

U.S. PATENT DOCUMENTS

| | | | |
|---|---|---|---|
| 4,866,517 | 9/1989 | Mochizuki et al. | 378/119 |
| 5,003,543 | 3/1991 | Morsell et al. | |
| 5,089,711 | 2/1992 | Morsell et al. | |
| 5,151,928 | 9/1992 | Hirose . | |
| 5,175,757 | 12/1992 | Augustoni et al. | |
| 5,235,606 | 8/1993 | Mourou et al. | |

FOREIGN PATENT DOCUMENTS

WO94/26080  11/1994  European Pat. Off. .

OTHER PUBLICATIONS

D. Umstadter, J. Workman, A. Maksimchuk, X. Liu, C. Y. Chien, and S. Coe, "Laser–Produced Picosecond Soft X–Ray Continuum Radiation", Proceedings of the International Conference on Lasers '93, 165–170, Aug. 1994.

B. R. Marx, "Terawatt Lasers Generate X–Ray Continuum from Gold Target", Laser Focus World, 15–16, Feb. 1995.

*Primary Examiner*—Don Wong
*Attorney, Agent, or Firm*—Barnes, Kisselle, Raisch, Choate, Whittemore & Hulbert, P.C.

[57] ABSTRACT

The present invention provides a system and an apparatus to produce x-rays from plasmas by focusing an intense, short duration optical pulse from a laser onto a target. The concentrated energy contained in the focused laser beam ionizes the target material, raising it to a temperature at which ions are produced in a chain reaction ionization, and x-rays are emitted when ions become de-excited (their electrons change energy level) or free electrons recombine with the ions in the plasma. The method comprises controlling pulse time duration of x-rays emitted from a plasma-forming target by generating a beam of one or more laser pulses; adjusting the intensity of the laser pulse to obtain a desired intensity incident at a surface of the plasma-forming target matter; directing the laser pulse onto the surface of the plasma-forming matter to generate the x-rays having a pulse duration which changes in proportion to a change in the incident laser pulse intensity. In one embodiment, the x-rays are then directed onto a sample target.

34 Claims, 11 Drawing Sheets

METHOD AND APPARATUS FOR GENERATING LASER PLASMA X-RAYS

Government Rights

This invention was made with government support provided by the National Science Foundation under Contract Number PHY-8920108 and the Office of Naval Research under Contract Number N00014-91-K-2005. The government has certain rights in the invention.

FIELD OF THE INVENTION

This invention relates generally to methods and systems which produce x-rays from plasmas and, in particular, to generating a plasma by directing a laser beam onto a target which produces plasma generated x-rays.

BACKGROUND OF THE INVENTION

Several sources for the production of x-rays have been developed. The electron-impact x-ray sources generally produce high energy x-rays which are difficult to control. Such x-rays, for example, are not usable in a lithography application. Synchrotron sources emit softer x-rays (extreme ultraviolet) but are limited by high cost and large physical dimensions. Laser produced x-rays are desirable, but heretofore, have yielded poor performance and efficiency and are difficult to control. Factors controlling x-ray emission from laser produced plasmas are not well understood. It has been suggested, theoretically, that mixed species targets might theoretically decrease duration of the x-ray emission. However, this technique has not been proven.

Accordingly, what is needed is a method and an apparatus for controlling laser produced x-rays to obtain acceptable x-ray conversion efficiency, very high x-ray brightness, and good control of the characteristics of the x-ray emission.

SUMMARY OF THE INVENTION

The present invention provides a system and an apparatus to produce x-rays from plasmas by focusing an intense, short duration optical pulse from a laser onto a target. The concentrated energy contained in the focused laser beam ionizes the target material, raising it to a temperature at which ions are produced in a chain reaction ionization, and x-rays are emitted when ions become de-excited (their electrons change energy level) or free electrons recombine with the ions in the plasma. The method comprises controlling pulse time duration of x-rays emitted from a plasma-forming target by generating a beam of one or more laser pulses; adjusting the intensity of the laser pulse to obtain a desired intensity incident at a surface of the plasma-forming target matter; directing the laser pulse onto the surface of the plasma-forming matter to generate the x-rays having a pulse duration which changes in proportion to a change in the incident laser pulse intensity. In one embodiment, the x-rays are then directed onto a sample target.

In one embodiment, the change in laser intensity at the plasma-forming target material is obtained by changing the spot size of the laser beam incident at the target. In the method of the invention, the laser pulse is generated by laser generating means, a laser focusing element is disposed between the laser generating means and the plasma-forming matter, and the change in spot size is obtained by changing the relative positions of the laser focusing element and the plasma-forming matter, whereby the intensity changes inversely with spot size.

In a preferred method, the x-ray pulse duration is reduced proportionately with intensity by increasing the laser spot size.

In an alternative embodiment, the intensity of the laser beam at the plasma-forming material is changed by adjusting the energy of the laser pulse whereby intensity changes in proportion to energy.

In still another embodiment, the intensity of the laser beam at the plasma-forming target material is changed by adjusting the time duration of the laser pulse whereby laser intensity at the plasma-forming target changes inversely with time duration.

In a preferred method, the pulse duration of the x-rays emitted from the plasma-forming target is controlled by heating the plasma-forming matter to obtain a plasma electron temperature which is less than a maximum temperature ($T_{max}$) defined by $kT_{max}=h\nu$, where T is in units of absolute temperature (°K., degrees Kelvin), k is the Stefan-Boltzmann constant ($1.3807 \times 10^{-16}$ erg/°K.), h is Planck's constant ($6.626 \times 10^{-27}$ erg-second), and $\nu$ is plasma photon frequency (1/second, (Second)$^{-1}$).

A preferred apparatus for use in forming x-rays from a plasma comprises a vacuum chamber; laser pulse generating means for generating a beam of one or more laser pulses; and first and second targets supported in the chamber. The first target comprises matter which forms the plasma from which x-rays are emitted upon bombardment by the laser. Beam splitting means to split the laser pulse into two pulses, a first laser pulse and a second laser pulse, before bombardment of the plasma-forming matter. Optical delay means delays the second laser pulse and direct it onto the second target. Laser focusing means, disposed between the laser generating means and the first target, focuses the first laser pulse onto the first target and adjusts the size of the spot of the beam and its corresponding intensity at the first target to produce a pulse of x-rays. The first and second targets are arranged in the vacuum chamber to define between them a path for the pulse of x-rays. The optical means and second target are arranged in the vacuum chamber to define between them a path for the second laser pulse.

In a preferred embodiment, the laser beam is obtained by chirped pulse amplification (CPA) means comprising means for generating a laser pulse; means for stretching such laser pulse in time; means for amplifying such time-stretched laser pulse including solid state amplifying media; and means for recompressing such amplified pulse to provide laser pulse duration of less than a picosecond, and laser pulse intensity sufficient to heat said plasma to said selected temperature. Laser contrast is controlled and is preferably on the order of $10^6$. Laser contrast is defined as the ratio of the level of intensity of an amplified spontaneous emission (ASE) to the peak intensity of the main laser pulse.

By the method and apparatus of the invention, it is possible to make very short x-ray pulses, that is, an x-ray pulse which is of very short time duration. This permits the study of time resolved phenomena in nature which occur very fast, analogous to using a very short flash with a camera. Another application is x-ray lithography where very short x-ray pulse duration would make possible the production of very fine features.

Accordingly, it is a general object of the invention to provide a method and apparatus for adjusting the pulse width (time duration) of x-rays.

Another object is to provide a method and apparatus for adjusting the position of a laser focusing element with respect to a target whereby the intensity of the laser at the target is adjusted which controls the temperature of the plasma which in turn controls the pulse duration of the emitted x-rays.

Still another object is to provide a method and apparatus for controlling x-ray pulses which achieves an x-ray pulse duration which has a profile corresponding to, proportional to, or similar to that of the laser pulse which generated the x-ray, and optimally approaches the profile of the laser pulse.

Another object is to provide a method and apparatus to generate a burst of x-rays which have a desired pulse duration and to provide a method whereby such pulse duration may be achieved proportionately with adjustment in certain parameters of the laser pulse which produced such x-rays.

Another object is to produce an ultrashort continuum by controlling both laser contrast and flux.

Still another object is to provide a method and apparatus to produce a burst of x-rays having a pulse duration as short as possible with as high a density as possible, providing an optimum quantity of x-ray emission.

These and other objects, features, and advantages of the invention will become apparent from the following description of the preferred embodiments, claims, and accompanying drawings.

BRIEF DESCRIPTION OF THE DRAWINGS

FIG. 13 contains laser pulse, plasma temperature, and x-ray pulse profiles. FIG. 14 shows x-ray pulse profiles.

Detailed Description of the Preferred Embodiments

The invention provides a system and an apparatus to produce x-rays from plasma by focusing an intense, short duration optical pulse from a laser onto plasma-forming target material. The method comprises controlling pulse time duration of x-rays emitted from a plasma-forming target by generating a beam of one or more laser pulses; adjusting the intensity of the laser pulse to obtain a desired intensity incident at a surface of the plasma-forming target matter; directing the laser pulse onto a surface of the plasma-forming matter to generate the x-rays having a pulse duration which changes in proportion to a change in the incident laser pulse intensity. In one embodiment, the x-rays are then directed onto a sample target. By the method and apparatus of the invention, the pulse duration of laser produced soft x-rays emitted from solid plasma-forming targets can be controlled, permitting a reduction in duration to as short as a few picoseconds. The apparatus of the invention includes a chirped pulse amplification (CPA) system for production of the x-rays. The CPA laser is capable of producing multi-terawatt subpicosecond laser pulses in a compact arrangement and is an ideal driver for the novel x-ray radiation source of the invention. In a preferred embodiment, in order to decrease the incident intensity on the target plasma-forming material, the laser spot size is defocused while keeping the total laser energy constant. The invention will be further understood by reference to Examples I and II.

EXAMPLE I

In this first Example, short pulse high intensity laser plasma interactions are investigated experimentally with temporally and spectrally resolved soft x-ray diagnostics. The emitted x-ray spectrum from a solid target is characterized for a laser intensities as high as $5\times10^{17}$ W/cm$^2$ (watts per square centimeter) with a pulse width of 400 fs (femtoseconds). Bright picosecond continuum emission in the 40–100 Å (Angstrom) spectral region is produced when high laser contrast is used. X-ray pulse durations as short as 10 ps (picoseconds) are achieved by adjusting the laser flux, and thus controlling the peak electron temperature relative to the ionization potential that corresponds to the emitted x-ray photon energy of interest.

Figure 1:
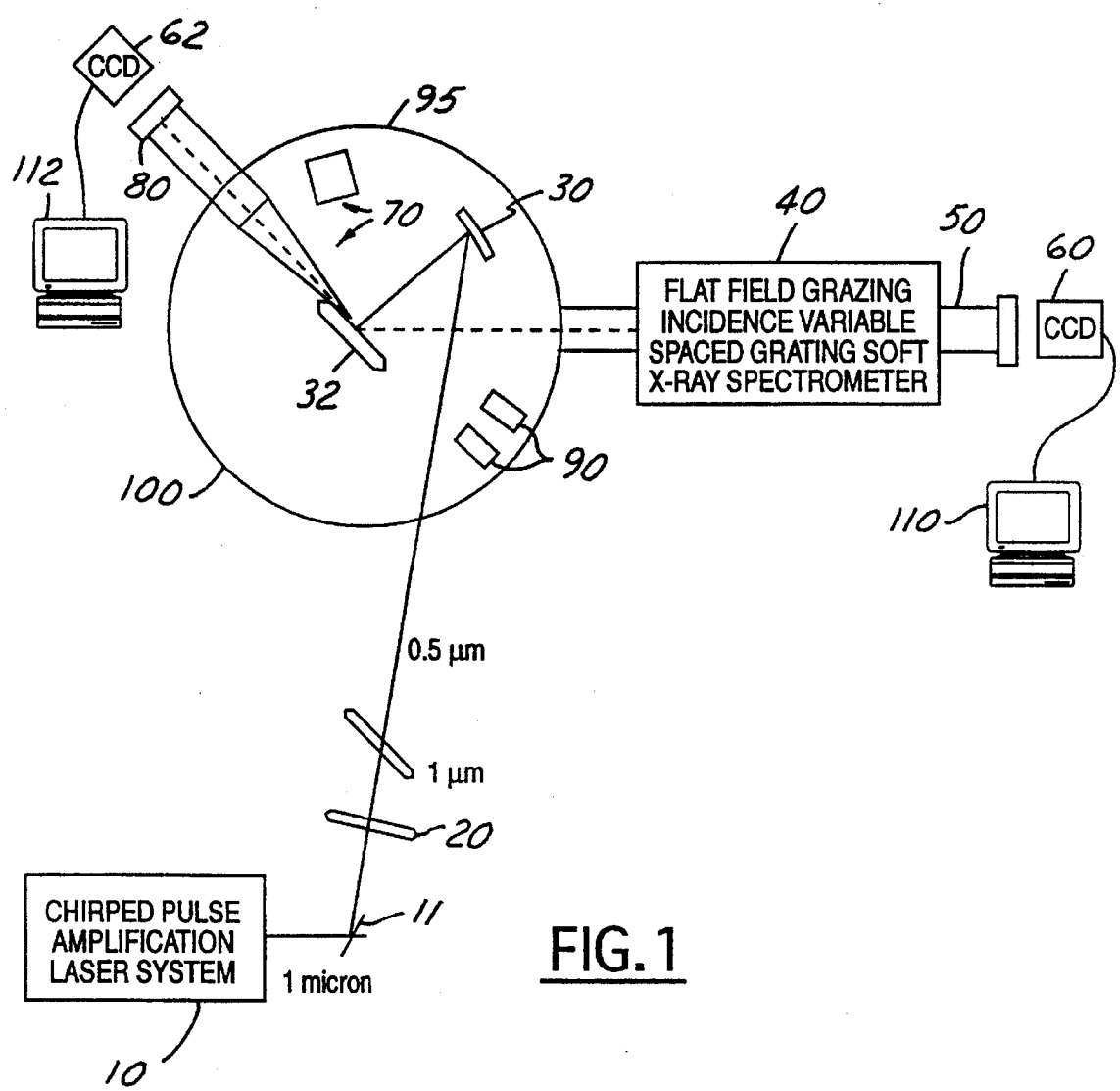
FIG. 1 is a schematic representation of a system for generating laser pulses to produce electron plasma temperature which causes such plasma to achieve an ionization stage from which x-rays are emitted, as used in Examples I and II. The system includes a chirped pulse amplification (CPA) laser system.

The experimental arrangement is shown in FIG. 1. The laser (10) used in the experiment is a 400 fs (femtoseconds) terawatt Nd:glass laser system based on chirped pulse amplification with a contrast ratio estimated to be greater than $10^{10}$. Mirror (11) directs the CPA laser beam. The contrast of the fundamental 1.06 µm (micron) laser light was measured to be $5\times10^5$. The contrast is then squared by frequency doubling the laser light to 0.53 µm (micron) with a doubling crystal (20). An off axis parabolic mirror (30) is used to focus the laser radiation to a minimum spot size of 11 µm (micron), corresponding to an intensity of $5\times10^{17}$ W/cm$^2$ (watts per square centimeter). The soft x-ray emission is dispersed using an imaging flat-field grazing incidence variable spaced grating spectrometer (40). Time resolved spectra are obtained in a single shot using a streak camera with a 5 ps (picoseconds) resolution that is read out with a CCD (charged couple device) camera. Pulse duration was not changed in the experiments. The beam was focused with an f/3 off axis parabolic (reflective optic). Minimum spot was 10 µm (microns) (full width half maximum) diameter. Maximum spot was approximately 300 µm (microns) FWHM diameter. No SEM was taken. Laser spot size defined in the experiments is simply the diameter of a circle where the Gaussian laser intensity has dropped to half its peak value. This is consistent with other definitions, such as, a diameter at 1/e of the peak value as well as at i/e$^2$ where e~2.7. All refer generally to the area affected by the laser pulse at a focal plane of a target. Spot size might be varied, for example, by varying the f/#, varying the focal length of the lens, or for example, by adjustable diaphragm or any other means.

Figure 2:
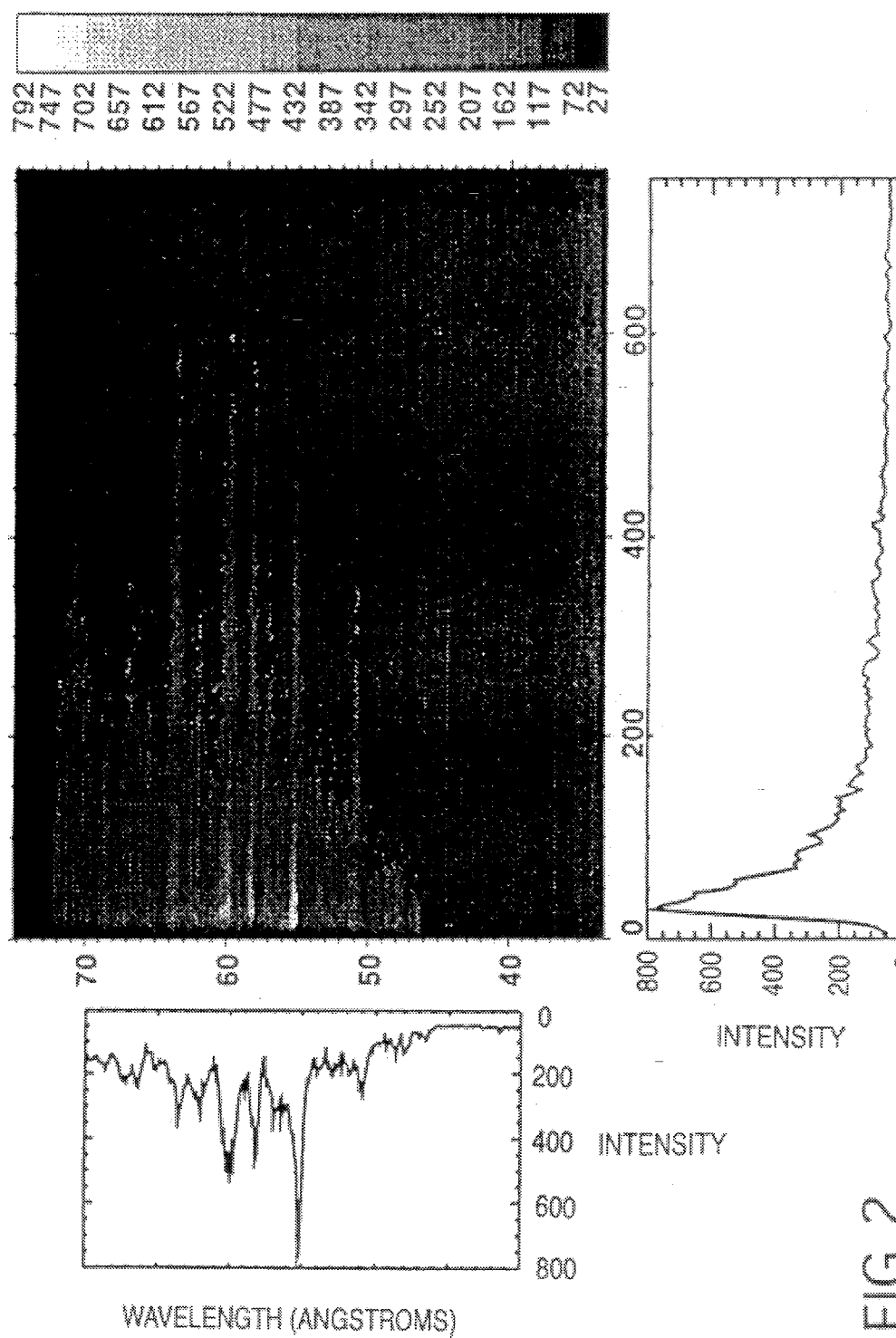
FIG. 2 shows streaked aluminum x-ray spectra obtained in a single shot with a high resolution grazing incidence spectrometer using 1 μm (micron) laser irradiation, corresponding to low contrast conditions. The central plot is a streak picture showing the x-ray amplitude (grayscale in units of CCD counts) versus wavelength (vertical axis in units of Å (Angstrom)) and time (horizontal axis in units of picoseconds). To the left is a line out in wavelength for t=25 ps (picoseconds), and at the bottom is a line out in time for λ=55 Å (Angstrom).
Figure 3:
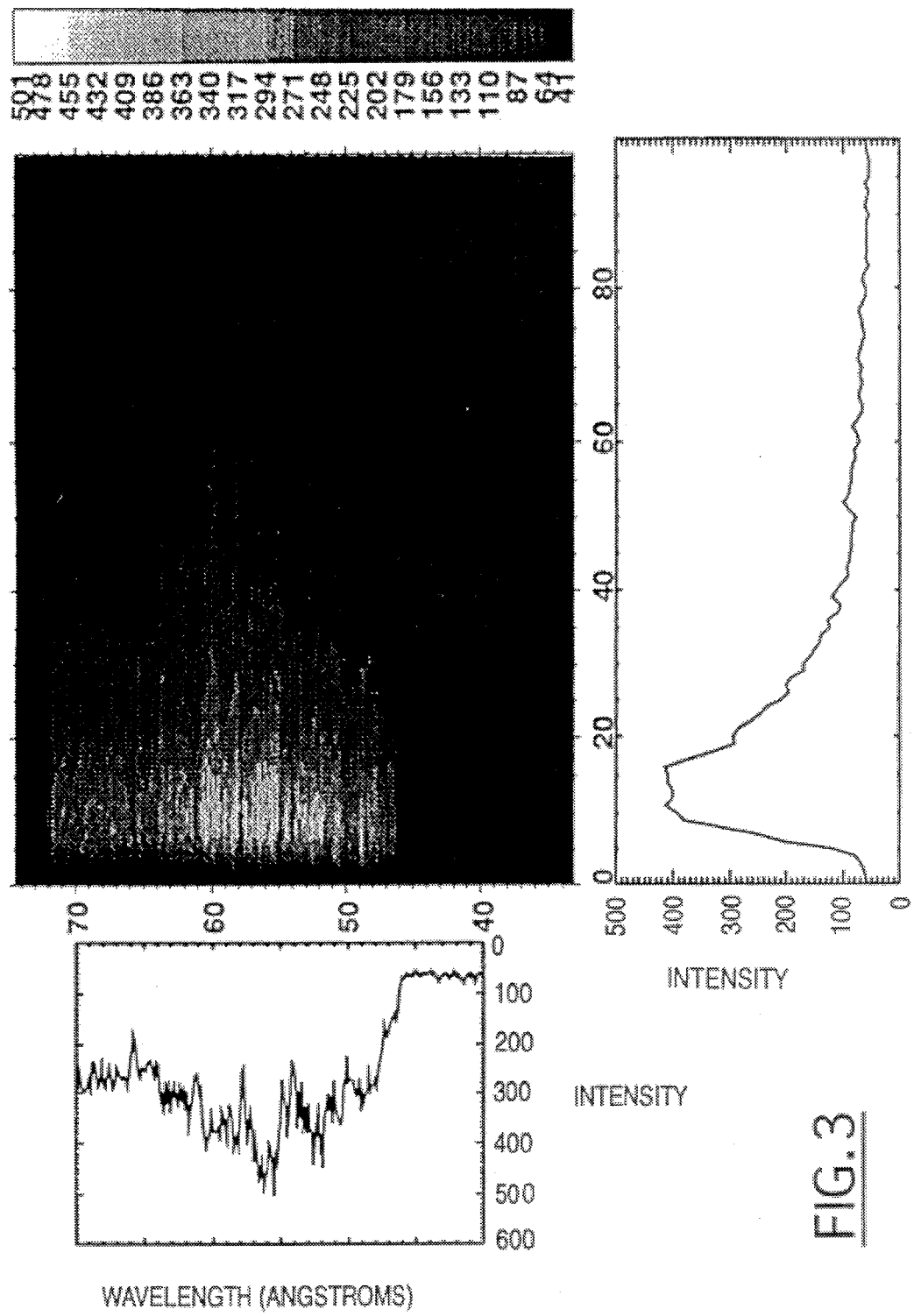
FIG. 3 shows streaked aluminum x-ray spectra obtained in a single shot with a high resolution grazing incidence spectrometer using 2χ (0.5 μm (micron)) laser irradiation, corresponding to high contrast conditions. The central plot is a streak picture showing the x-ray amplitude (grayscale in units of CCD counts) versus wavelength (vertical axis in units of Å (Angstrom)) and time (horizontal axis in units of picoseconds). To the left is a line out in wavelength for t=7 ps (picoseconds), and at the bottom is a line out in time for λ=55 Å (Angstrom).
Figure 4:
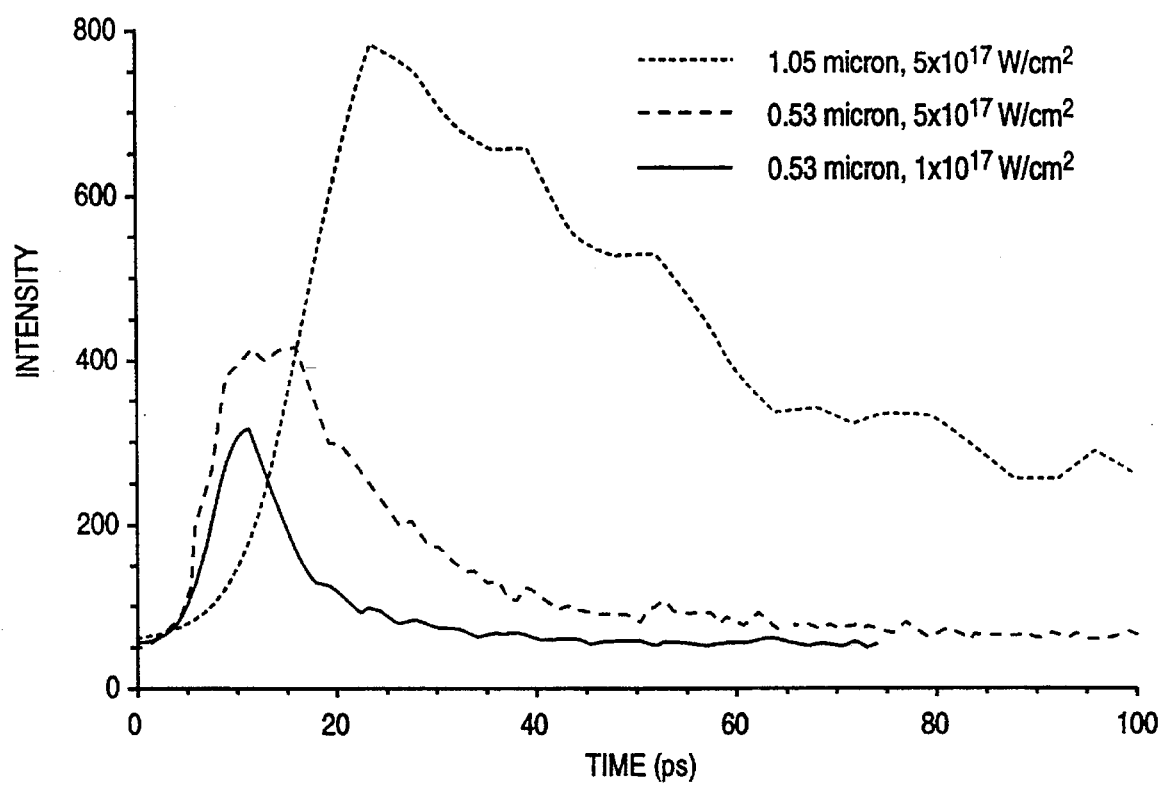
FIG. 4 shows a comparison of line outs from FIG. 2 (short dashed line), FIG. 3 (long dashed line), and same as in FIG. 3 except lower laser flux (solid line).

FIG. 2 shows the emission using 1 µm (micron) laser irradiation on an aluminum target (Z=13), corresponding to low contrast conditions. The central plot is a single shot streak picture showing the x-ray amplitude (grayscale in units of CCD counts) versus wavelength (vertical axis in units of Å (Angstrom)) and time (horizontal axis in units of picoseconds). To the left is a line out in wavelength for t=25 ps (picoseconds), and at the bottom is a line out in time for λ=55 Å (Angstrom). It can be seen that the emission is dominated by lines and that the pulse duration is long, τ~70 ps (picoseconds) (FWHM, full width at half maximum). FIG. 3 shows aluminum emission using 2ω (0.5 µm (micron)) laser irradiation, corresponding to high contrast conditions. To the left is a line out in wavelength for t=7 ps (picoseconds), and at the bottom is a line out in time for λ=55 Å (Angstrom). Note that in the high contrast case the emission is a continuum over the entire wavelength range and that the pulse duration (τ~25 ps (picoseconds)) is shorter than in the low contrast case. In both Figures, the sharp short wavelength cutoff near the C K-edge (44 Å (Angstrom)) is due to absorption by the plastic film (Lexan trademark brand) that supports the potassium bromide photo-cathode. FIG. 4 shows a comparison between the line outs from FIG. 2 (short dashed) and FIG. 3 (long dashed line). FIG. 4 also shows a line out of emission obtained under the same conditions of FIG. 3 except with a lower laser flux (solid line), I=$1\times10^{17}$ W/cm$^2$ (watts per square centimeter). In the high contrast low flux case, the x-ray pulse width is even shorter, 10 ps (picoseconds).

Referring to FIG. 4, note that the rise time is essentially streak camera limited in all cases; since the 1.05 µm (micron) emission was streaked at a slower speed, it appears to have a longer rise time. (Due to streak camera timing jitter, the actual starting positions of the plots relative to the laser pulse and each other are unknown.) The fall time, which is determined by the cooling rate due to expansion and diffusion, is faster for the high contrast case, presumably because the plasma density scale length is shorter and the density higher. The density is higher both because the critical density is higher for 2ω and because with high contrast the absence of a pre-plasma allows direct deposition at densities above the critical density. An exponentially decreasing cooling rate occurs because the cooling is driven by the density and temperature gradients, both of which decrease as the plasma expands into the vacuum and heat conducts into the cold regions of the solid.

The reason that the emission is shortest in duration in the low flux high contrast case (solid line) is because, unlike the high flux case (long dashed line), the plasma was not overdriven. By overdriven we mean that the plasma electron temperature ($T_c$) significantly exceeds the threshold temperature ($T_0$) for emission of 55 Å (Angstrom) photons (corresponding to hν=225 eV). At $T_0$ the plasma has an average ionization stage (Z) with a transition of this photon energy. Significant emission of photons with energy hν occurs only when $T_c>T_0$. If the peak temperature greatly exceeds $T_0$, Z will go to the next higher ionization stage, with emission occurring in either (or both) the heating or cooling phase.

Figure 5:
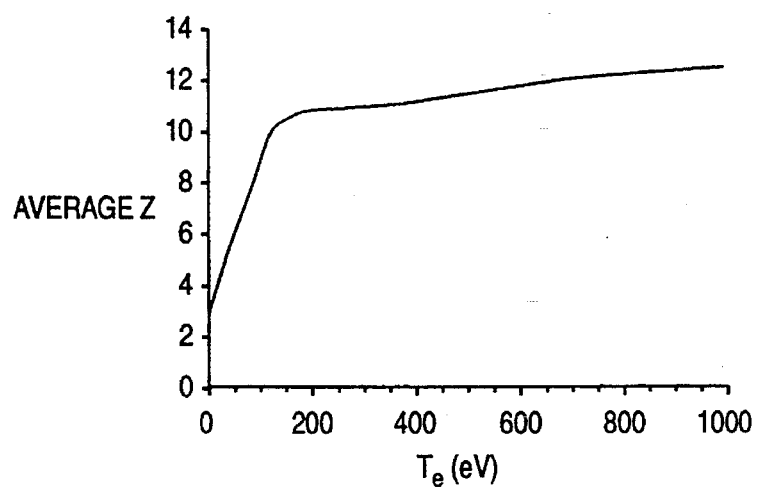
FIG. 5 shows average Z versus electron temperature calculated from a collisional radiative model, assuming solid density, and including pressure ionization.

However, because of the large gap in ionization potential energy (~1.5 KeV) between the last ionization stage of the L shell of aluminum (Al XI) and the first stage of the K shell (Al XII), Z is expected to remain at Al XII for high $T_c$, becoming relatively independent of changes in $T_c$. Such an effect is shown quite clearly in FIG. 5, which shows Z versus electron temperature, calculated from a collisional radiative model, assuming solid density, and including pressure ionization. It can be seen that near $T_0$ the proportionality between Z and $T_c$ is reduced. (Of course, the temperature at which the curve changes slope depends on the density and the model for ionization.) The above energy gap explains the differences between the temporal profiles in the high and low flux cases of FIG. 4. Since the plasma remains primarily in the Al XII stage, only recombination from the continuum into Li like stages is possible. In the low flux case, the recombination emission falls exponentially immediately after reaching its peak, consistent with a peak temperature near $T_0$. In the high flux case, however, after reaching its peak, the emission remains flat until t=17 ps (picoseconds), when presumably $T_c$ drops below $T_0$ from a much higher peak value, and only then begins to exponentially decrease. A much higher $T_c$ is expected with high flux because of the proportionality (approximately linear) between them.

Several factors may be responsible for the predominance of continuum radiation only in the high contrast case. Continuum radiation may be produced directly by radiative recombination, a free bound process is illustrated by the formula $X(z+1)+e^-\rightarrow X(z)+h\nu$, which increases linearly with the plasma electron density. Bremsstrahlung, or free-free continuum, is not expected to play an important role at these temperatures and densities. However, Stark broadening of lines and opacity effects, both of which may produce continuum like spectra, may also be important at high density. The line to continuum ratio is also a function of the electron temperature. The absence of lines in FIG. 3 indicates that the emission is approaching that of a blackbody.

This first example shows that an ultrashort continuum can be created by controlling both the laser contrast and flux. This bright continuum source provides an efficient flashlamp for photo-ionization pumping of recombination lasers, producing lower temperature plasmas, and thus higher gain, than with collisional pumping.

Although not wishing to be held to any particular theory, based on Example 1, theory can provide some general predictions about how the plasma parameters and the x-ray emission should evolve. Of course, a plasma can generate x-ray line emission of photon energy $h\nu_0$ only if it reaches an ionization stage $Z_0$ with a transition corresponding to that ionization stage. This happens when the electron temperature $T_c$ reaches the "ionization temperature" $T_0$ for that stage, which in equilibrium is taken to be approximately one third the ionization potential corresponding to $Z_0$. A given region of the plasma is heated either by direct deposition of laser energy or by diffusion of heat from neighboring regions. The rise time of the x-ray pulse is roughly determined by the time it takes to heat that region from which the emission will be greatest to $T_0$.

The plasma cools either by expansion into the vacuum, or heat conduction into the colder regions of the solid. The cooling rate should decrease exponentially with time because it is driven by the density and temperature gradients, both of which also decrease with time. If the plasma were in LTE, the ionization degree would closely follow changes in $T_c$. In this case the maximum ionization degree $Z_{max}$ would be determined by the maximum plasma temperature. As the temperature drops, the average ionization stage will drop below some threshold ionization stage for bound-bound emission from a particular ion species ($Z_0$). If $Z_{max} \gg Z_0$ then it will take some time ($\tau_0$) to drop below this threshold. The bound-bound x-ray emission from this ion species will have a pulse duration $\tau_0$. To obtain a shorter pulse of x-rays it is desirable to keep the ratio of $Z_{max}$ to $Z_0$ low therefore reducing $\tau_0$. This in turn requires a lower peak $T_c$ which translates into using a lower laser intensity.

There is a tradeoff to be made, however: keeping the above ratio of $Z_{max}$ to $Z_0$ low implies that the maximum ionization degree $Z_{max}$ will be kept low, and if it is kept too low, the x-ray intensity originating from $Z_0$ will be greatly reduced. For x-rays of energy $h\nu_0$, the optimal conditions for a short pulse width and yet a high x-ray intensity, are such that $Z_{max} \sim Z_0$, which means there exists an optimal $T_c$, and thus an optimal laser intensity, for a given target element. In order to maximize the total x-ray flux, the total number of x-ray emitters should also be maximized. This can be done by maximizing both the plasma density and the radial dimensions of the region over which the optimal ionization conditions exist. The former means that the shortest laser pulse should be used, in order to increase the direct deposition of laser energy at solid density. The latter implies that the laser spot size should be maximized, but, of course, in such a way that the peak laser intensity will be equal to its optimal value for the laser energy available.

EXAMPLE II

As shown in FIG. 1, in performing the experiment, the laser used was a 400 fs (femtoseconds) terawatt Nd:glass laser system (10) based on chirped pulse amplification. The intensity contrast ratio of the peak of the fundamental 1.06 µm (micron) laser light to the amplified spontaneous emission (ASE) pedestal, measured to be $5 \times 10^5$, was increased to $10^{10}$ by frequency doubling with a doubling crystal (20). An off axis parabolic mirror (30) was used to focus the S-polarized $2\omega$ laser radiation onto a solid target (32) at normal incidence. A minimum spot size of 15 µm (micron) with an energy of about 300 mJ (millijoule) was achieved, corresponding to a maximum intensity in the second harmonic light of $5 \times 10^{17}$ W/cm$^2$ (watts per square centimeter). Targets (32) included 4 µm (micron) thick aluminum and gold deposited onto silicon wafers. In order to decrease the incident intensity on the target, the laser spot size was defocused while keeping the total laser energy constant.

The soft x-ray emission was spectrally dispersed using an imaging flat field grazing incidence variable spaced grating spectrometer (40) located at an angle of 45 degrees to the target normal. With a spectrometer entrance slit width of 200 µm (micron) we obtained a spectral resolution, $\lambda/\Delta\lambda$, of about 300 at 50 Å (Angstrom). Time resolved spectra were obtained in a single shot, using an x-ray streak camera (50) with a potassium bromide photo-cathode supported by a plastic film, coupled to the spectrometer. The temporal resolution was 5 ps (picoseconds). The read out was obtained by CCD (charge coupled device). A 20 µm (micron) x-ray pinhole camera (70) filtered with 25 µm (micron) of Be and 6000 Å (Angstrom), is coupled to an intensified microchannel plate detector (80) to monitor the laser spot size and emission region. Two PIN diodes (90) filtered with 50 µm (micron) and 100 µm (micron) of Be were used to monitor relative keV x-ray emission levels and to monitor the reproducibility of each interaction. A calibrated calorimeter was used to monitor the laser energy of each shot. To obtain quantitative conversion efficiencies of the laser radiation into x-rays, in the range of 1.5–5 keV, x-ray film (95) (a Kodak brand name DEF film) was used with steps of Be filters of different thicknesses and with known characteristic absorption curves. The target (32) was held in a vacuum chamber (100). Computers (110) and (112) were used to compile data from CCD (60) and (62), respectively.

Figure 6:
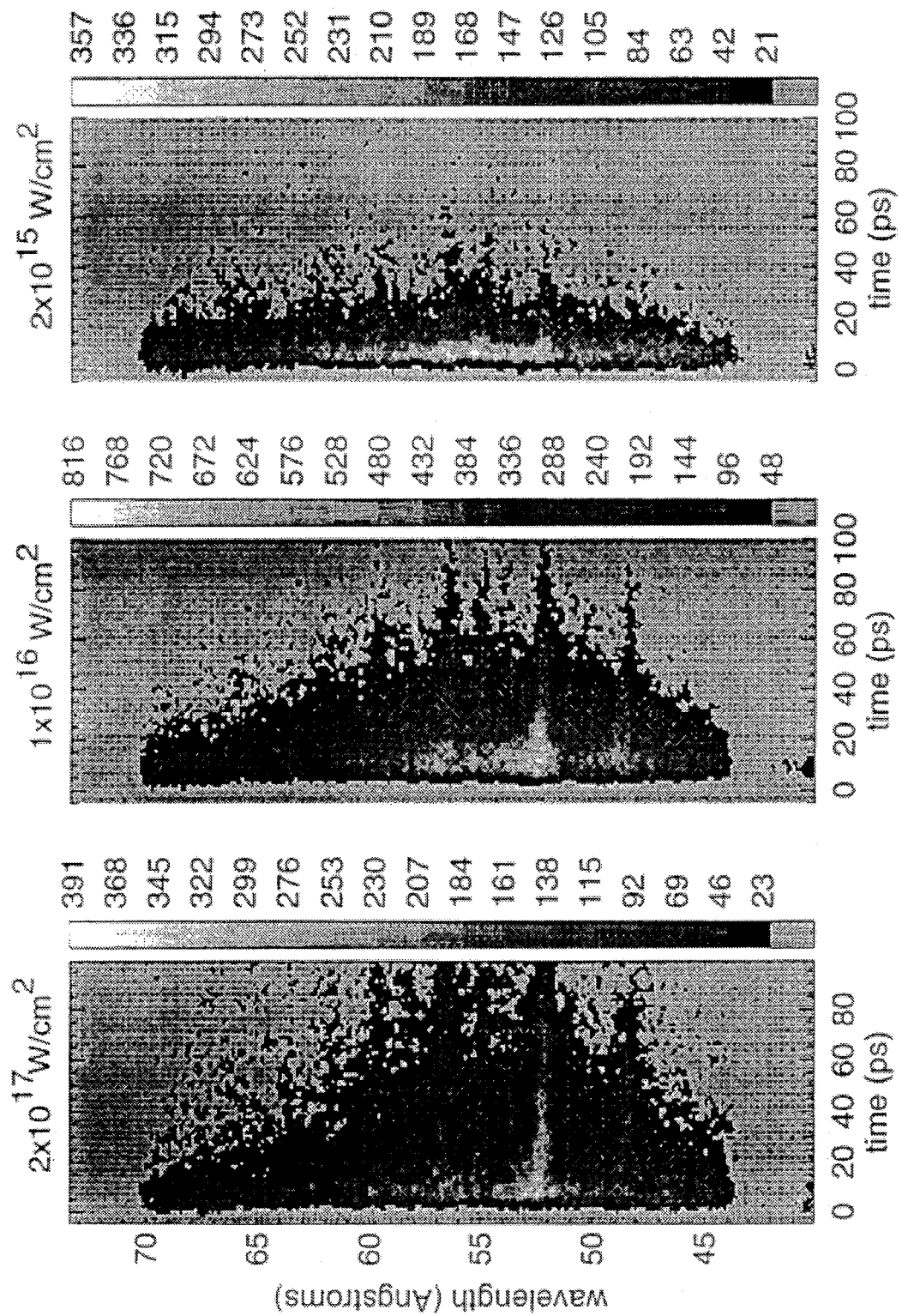
FIG. 6 shows temporally and spectrally resolved aluminum x-ray emission obtained for three different laser intensities.

The dependence of x-ray pulse duration on laser intensity is demonstrated in FIG. 6, which shows single shot aluminum x-ray emission for three different laser intensities, ranging from $2.0 \times 10^{17}$ down to $2.0 \times 10^{15}$ W/cm$^2$ (watts per square centimeter). (Specifically, $2 \times 10^{17}$, $1 \times 10^{16}$, and $2 \times 10^{15}$ W/cm$^2$ (watts per square centimeter).) X-ray emission in this region of 45 to 70 Å (Angstrom) is dominated predominantly by AlXI and AlX ions, where the strongest feature observed is the AlXI 2p–3d emission line at 50 Å (Angstrom). The decrease in x-ray pulse duration over the entire spectrum with decreasing laser intensity is clearly demonstrated in this figure. At the lowest laser intensity one can see the emission from lower ionization stages in the 55 to 60 Å (Angstrom) wavelength region.

Figure 7:
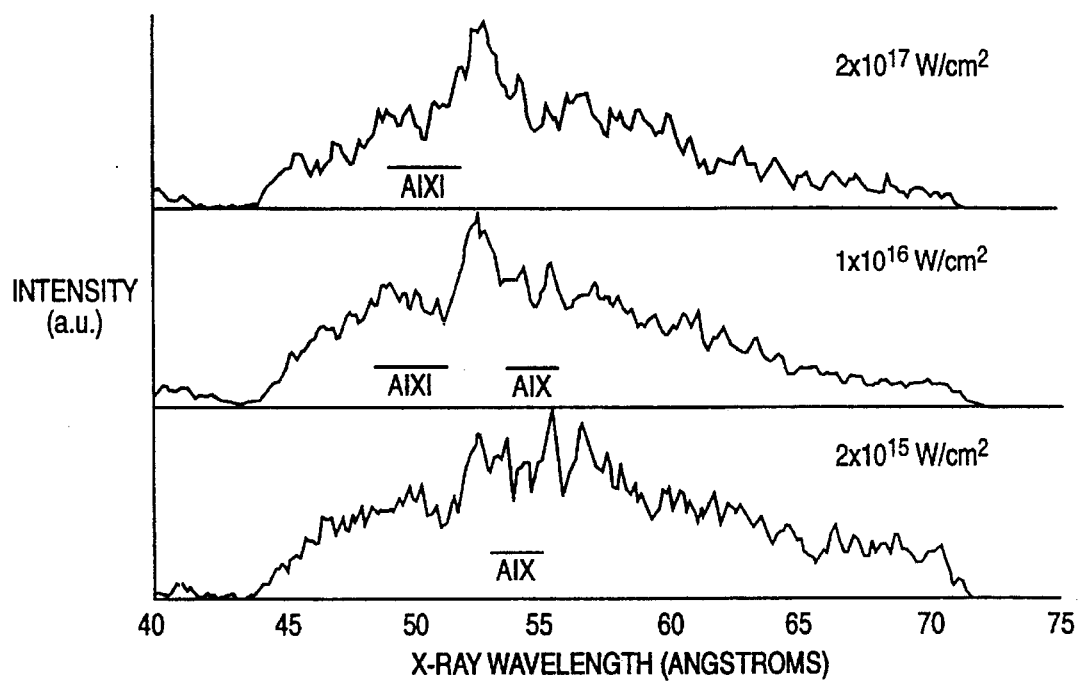
FIG. 7 shows aluminum spectra at the peak of emission for three laser intensities showing both the change in peak temperature with laser intensity and the effects of high density broadening. Spectral resolution is approximately 0.2 Å (Angstrom) as determined by long pulse (nanosecond) illumination of a solid target.

The change in the ionization balance is seen in FIG. 7, which shows the spectral traces of FIG. 6 at the peak of the emission for each laser intensity. Indicated in the figure are the AlXI 2p–3d and 2s–3p transitions as well as the AlXI 2s2p–2s3d and 2p$^2$–2p3d transitions. One can see clearly that the AlX ionization becomes stronger with respect to the AlXI ionization stage as the laser intensity is decreased, indicating a corresponding decrease in peak electron temperature. The Stark broadening of the line emission, seen in FIG. 7, demonstrates that the emission originates from high density in each case. (We measured a spectral resolution of approximately 0.2 Å (Angstrom) in a separate experiment using long pulse (nanosecond) illumination of both carbon and beryllium. As can be seen in FIG. 7, the broadening is on the order of one Angstrom or greater.)

Figure 8:
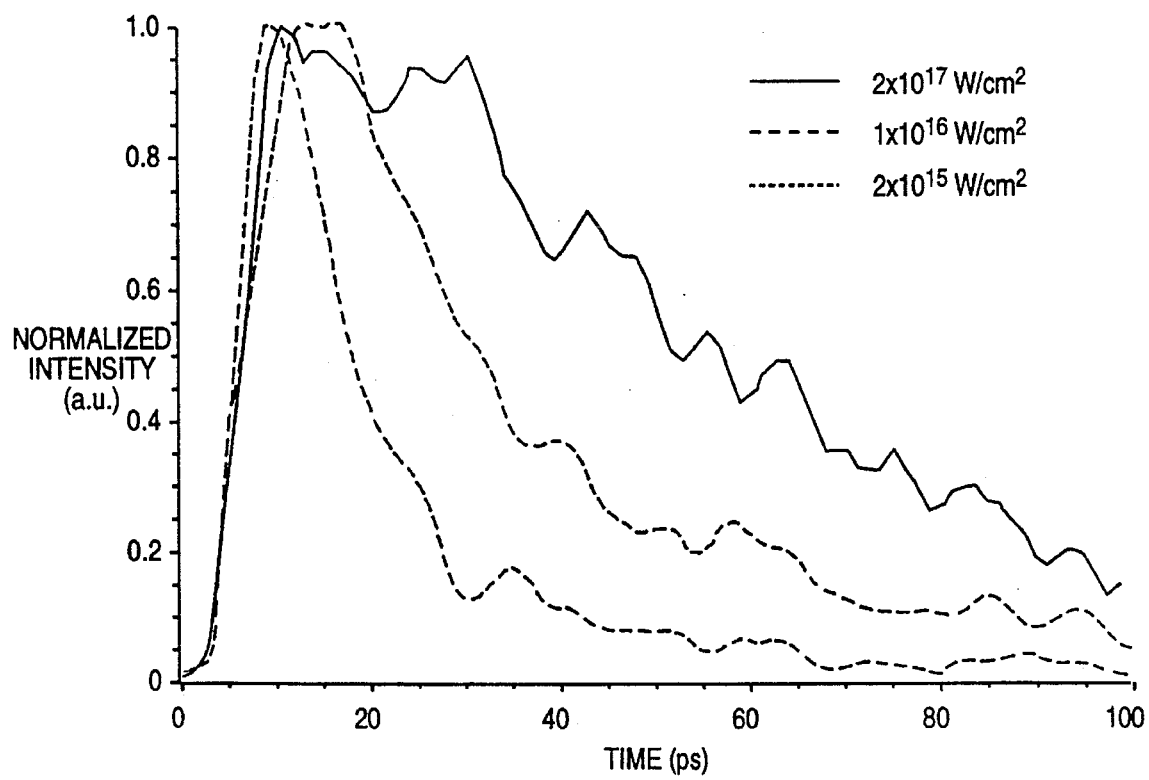
FIG. 8 shows a comparison of amplitude normalized temporal profiles of the AlXI $1s^22p-1s^23d$ transition obtained experimentally, showing the reduction of pulse duration with decreasing laser intensity.

FIG. 8 shows a comparison of amplitude—normalized temporal traces (profiles) from FIG. 6 of the AlXI 2p–3d emission line ($\lambda$=52.4 Å (Angstrom)) obtained for 2$\omega$—irradiation for a range of laser intensities. Again, one clearly sees the pronounced decrease of the x-ray pulse duration as the laser intensity is decreased. The rise time is short in all cases as expected from the rapid heating. (The starting positions of the plots relative to the laser pulse and each other are unknown.) The fall time is observed to be shorter and the slope of the decay much steeper in the lowest laser intensity case. Similar results were obtained for the AlXI 2s–3p transition.

Figure 9:
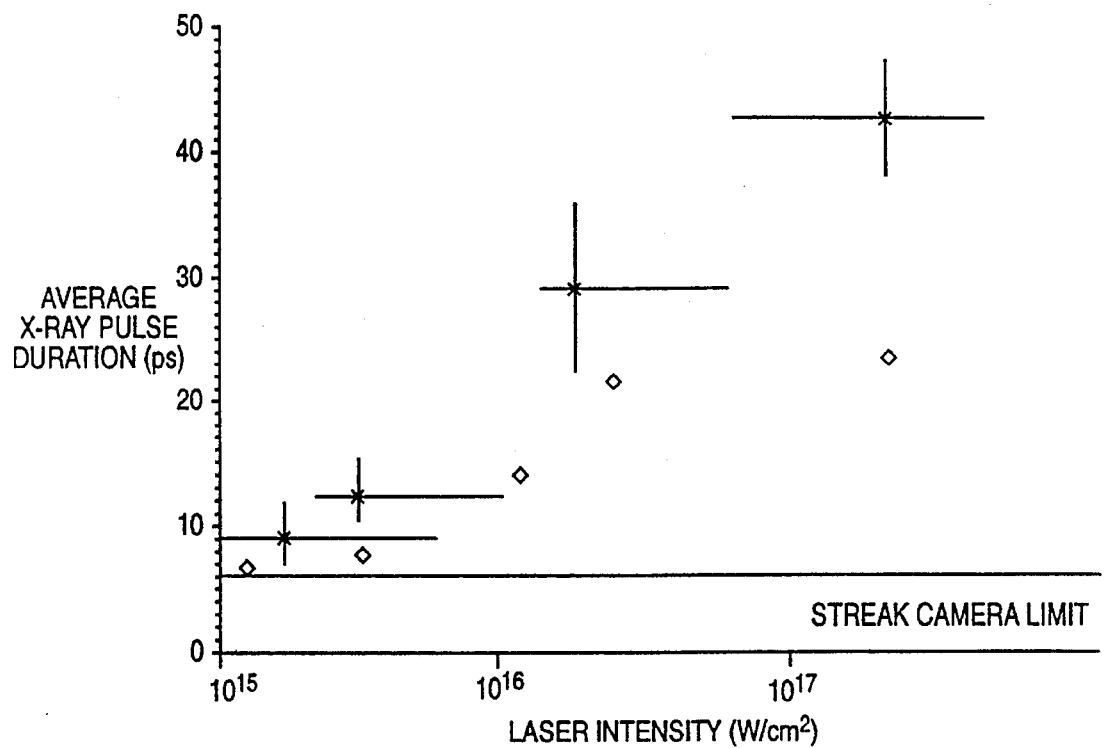
FIG. 9 shows duration of the x-ray emission, at (λ=52.4 Å (Angstrom)), versus laser intensity as measured experimentally: aluminum (crosses) AlXI 2p–3d, gold (diamonds).

FIG. 9 shows the comparison of measured x-ray pulse duration as a function of laser intensity for two different materials, aluminum and gold. The averaged experimental aluminum pulse widths at $\lambda$=52.4 Å (Angstrom) are shown as crosses, while the gold data, also at $\lambda$=52.4 Å (Angstrom) is represented by the open diamonds. The data was averaged over three to five laser shots with the standard deviation of the pulse duration shown by the vertical error bars. Horizontal error bars indicate spot size uncertainty, as measured by our pinhole camera and, at low laser energy (about 0.5 mJ (millijoule)), by optical techniques. For the same laser intensity, the gold x-ray pulse duration was found to have a significantly shorter pulse duration, as seen in FIG. 9, and was streak camera limited at the lowest intensity. This is presumably due to the higher electron densities that one would expect in a high Z material such as gold, which lead to faster cooling rates.

Figure 10:
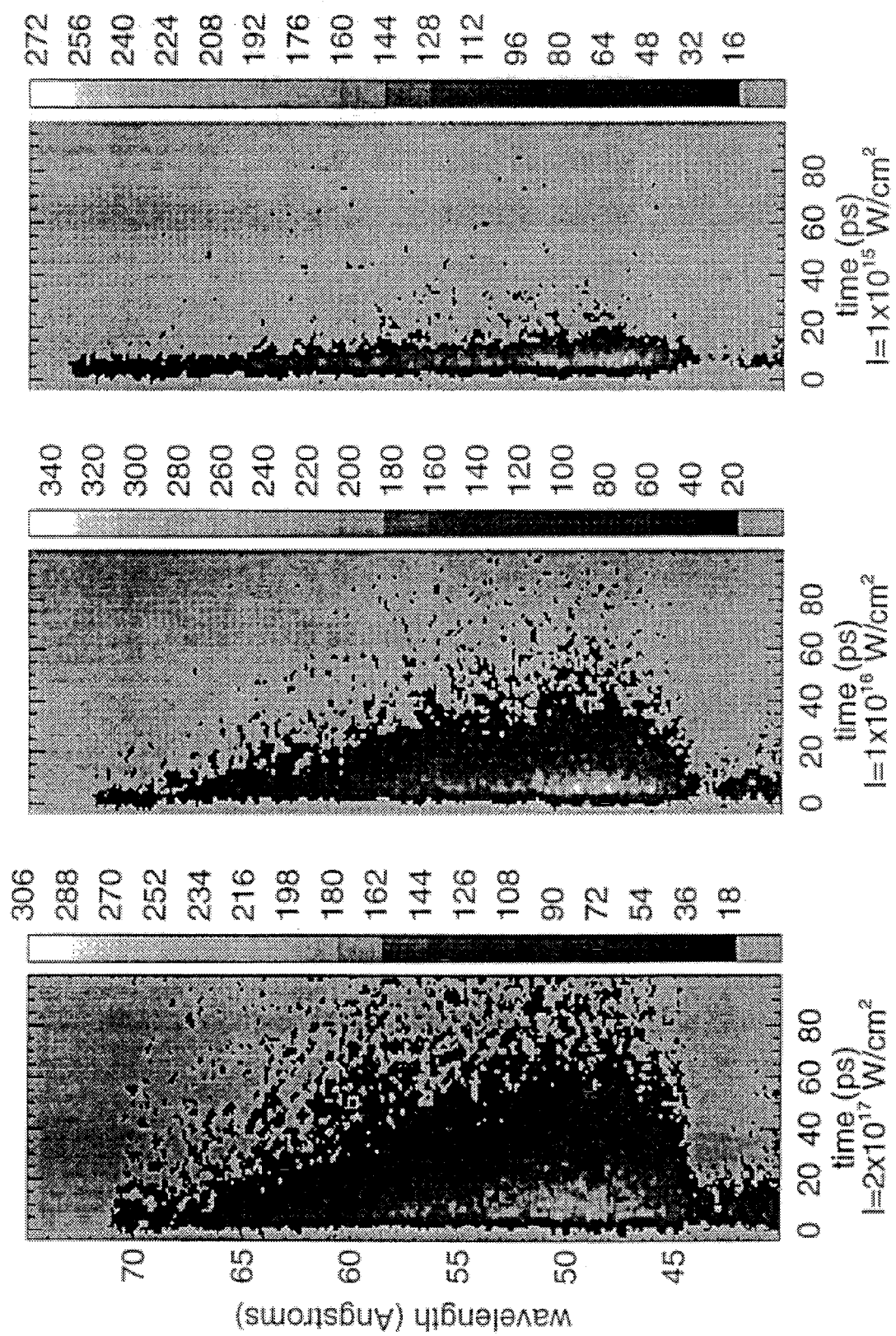
FIG. 10 shows streaked gold x-ray emission using high contrast conditions for three different laser intensities ranging from $I=2.0\times10^{17}$ W/cm$^2$ (watts per square centimeter) down to $I=2.0\times10^{15}$ W/cm$^2$ (watts per square centimeter).

FIG. 10 is the same as FIG. 6 except that gold was used instead of aluminum. The much higher density of lines in the x-ray photon range makes this effectively a continuum source.

Figure 11:
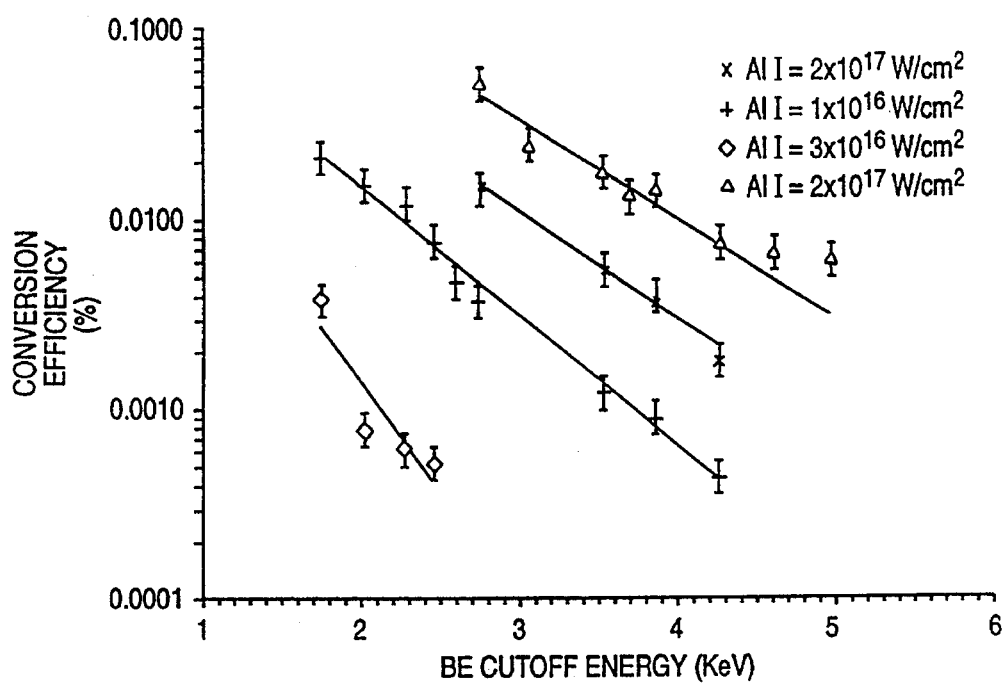
FIG. 11 shows measured x-ray conversion efficiency for aluminum and gold solid targets for a range of laser fluxes.

Data on conversion efficiency of laser radiation into x-rays in the range of 1.5–5 keV are shown on FIG. 11. Note that conversion efficiency for the gold target is about 4 times higher than for the aluminum target. For the highest laser fluxes on target the conversion efficiency can reach about 0.1 percent (up to a mJ (millijoule)) for the x-ray photons with $h\nu \geq 1$ keV. The conversion efficiency appears to be increasing toward longer wavelength consistent with the blackbody emission from an optically thick, few hundred eV plasma.

For the highest laser intensities on target, the conversion efficiency reached about 0.1 percent (up to one mJ (millijoule)) for the x-ray photons with $h\nu \geq 1$ keV. The conversion efficiency increases toward longer wavelengths, implying even higher conversion efficiencies, and therefore even higher brightness, in the soft x-ray region. Also, a measured increase in x-ray yield (normalized to the emission volume) with increasing laser intensity, implied a corresponding increase in electron temperature, as expected from previous work. Conversion efficiency for the gold target was found to be four times higher than for the aluminum target due to the higher density of emission lines in this spectral region.

While not wishing to be held to any particular theory, in the most general terms, the duration of emission for a particular x-ray line from a plasma ion is determined by the dynamics of the electron energy level populations. At high plasma density, these factors depend on the rate of collisions between free electrons and ions. The rise time of the x-ray pulse is roughly determined by the plasma heating time. In the absence of radiative heating, a given region of the plasma is heated either by direct deposition of laser energy or by diffusion of heat from neighboring regions. The decay of the x-ray emission will be controlled by cooling processes, which include both expansion into the vacuum and heat conduction into the colder regions of the solid. For a particular ion, bound-bound emission from any local region of the plasma, at any given time, is determined by the population densities of the various allowed energy levels. More precisely, the emission will be controlled by the source function, defined as the emissivity divided by the opacity, $\epsilon/K$. For bound-bound emission, the temporal behavior of the source function depends almost linearly on $n_u/n_1$, where $n_u$ is the upper state population density of the transition considered and $n_1$ is the lower state population density. The time history of the emission is then determined by the time history of the upper and lower state density ratio.

Consider an atomic system consisting of $n_u$ and $n_l$ and a free electron population. For the conditions of the experiments with aluminum, lithium-like ions at high density (which gives rise to continuum lowering), this system is not unreasonable. In a collisionally dominated plasma, the populations of the two bound levels are controlled both by the collisional excitation and collisional de-excitation rates between the two levels, and by the collisional ionization and recombination rates between the bound and free states. Because the collisional de-excitation rate per ion is proportional to $n_e/\sqrt{T_e}$, and the collisional excitation rate per ion is proportional to $n_e \exp(-h\nu_{u1}/kT_e)/\sqrt{T_e}$, the ratio of these two rates is controlled by the factor $\exp(-h\nu_{u1}/kT_e)$. For the recombination and collisional ionization rates, the net recombination into any particular level scales as $\exp(\chi/kT_e)$, where X is the ionization potential. The net rate of change of population between the two bound levels due to recombination of free electrons, again scales as $\exp(-h\nu_{u1}/kT_e)$. Note that the higher the electron temperature, the smaller the difference between the rates and, therefore, the smaller the change in the ratio $n_u/n_1$, for a given change in the electron temperature. A higher peak electron temperature would mean a slower decrease in emission, which changes linearly with the population ratio, and, therefore, a longer-pulse duration, for a given cooling rate. As the electron temperature decreases, the difference between the rates begins to change more rapidly. Obviously, if the collision rates are lower than the spontaneous rates, there will be very little dependence of pulse duration on electron temperature. This shows that the x-ray pulse width is determined by the time history or profile of the upper state and lower state density ratio.

Two assumptions are implicit in the above derivations. First, as the laser intensity increases, the total amount of absorbed energy increases, leading to higher electron temperatures. Second, the cooling rate does not depend strongly on the peak value of the electron temperature. The pulse duration dependence on temperature predicted above explains the experimental results as per FIGS. 2 through 11, in which the x-ray pulses under high laser intensity conditions are longer in duration than under conditions of lower laser intensity.

It may thus be concluded that the peak electron temperature must not much exceed a certain value in order to obtain short duration x-ray pulses. However, if the temperature is kept too low, the x-ray intensity will be greatly reduced because the proportion of ions responsible for emission, in a particular spectral region, will be smaller. This means that to obtain short, bright x-ray pulses, of a given photon energy, there exists an optimal electron temperature, and thus an optimal laser intensity as observed experimentally.

The experimental data clearly shows the predicted drop in x-ray pulse duration with decreasing laser intensity. As noted earlier in FIG. 8, the slope of the decay of the x-ray emission is steeper in the lower intensity case, with a corresponding decrease in electron temperature (as seen in FIG. 7). This is consistent with the temporal dependence of x-ray emission on temperature discussed above. Both the Stark broadened emission profiles, shown in FIG. 7, and the intensity dependence of the x-ray pulse duration support the conclusion that the x-ray emission is, in fact, generated in highly collisional regions of the plasma.

Figure 12:
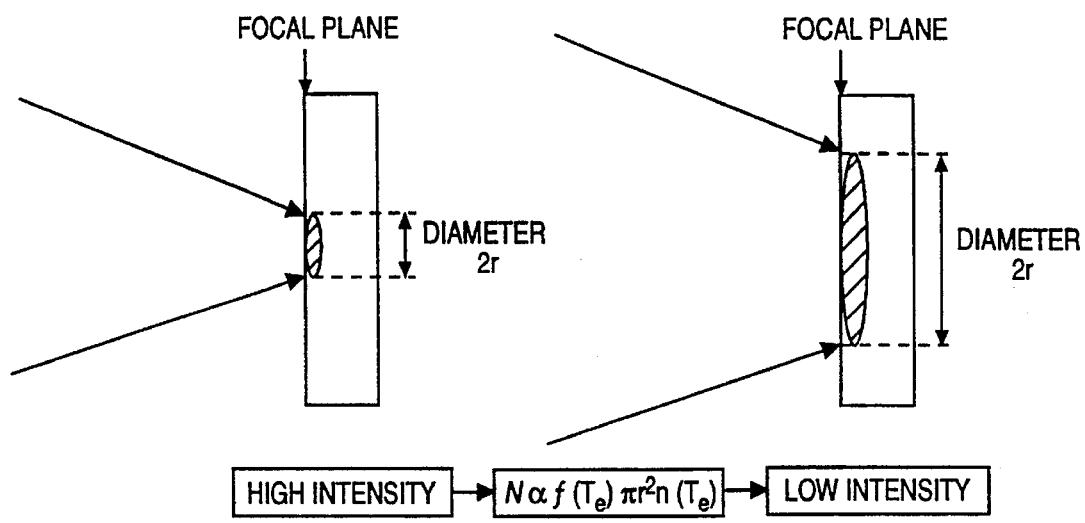
FIG. 12 shows how laser intensity is adjusted by changing spot size, by changing the focal area at a target, as by defocusing.

In order to maximize the total x-ray emission and minimize the pulse duration, the total number of x-ray emitters (N in FIG. 12) should be maximized while optimizing the temperature. If the peak electron temperature ($T_c$) is kept too low, the x-ray intensity will be greatly reduced because the proportion of ions responsible for emission, in a particular spectral region, will be smaller. The x-ray emission can be kept high by maximizing both the plasma density (N, FIG. 12) and the radial dimensions of the region ($\pi r^2$, FIG. 12) over which the optimal temperature conditions ($T_c$) exist. The former means that the shortest laser pulse should be used, in order to increase the direct deposition of laser energy at solid density (N). The latter implies that the laser spot size $\pi r^2$) should be maximized, while keeping the peak laser intensity equal to its optimal value for the laser energy available.

Figure 13:
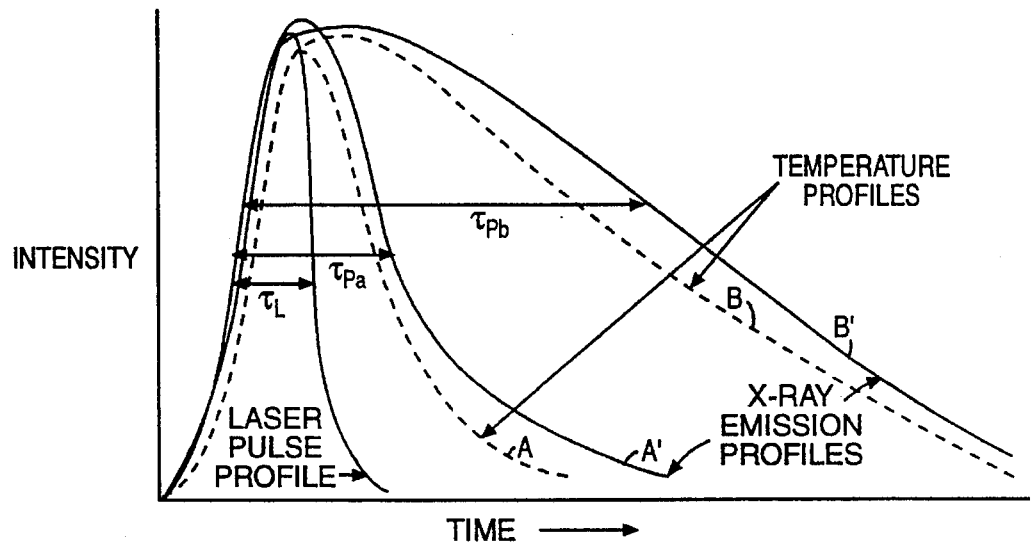
FIGS. 13 and 14 show sets of profiles of intensity versus time.

The conditions which result in maximizing total x-ray emission and minimizing pulse duration are further illustrated with reference to the profiles contained in FIGS. 13 and 14 and the curve shown in FIG. 15. FIG. 13 shows profiles of laser pulse, x-ray emission, pulse and plasma temperature. The laser, x-ray emission, and temperature profiles (Note: profiles A & A') roughly correspond and are roughly proportional with the change in plasma temperature when the relationship $kT_{max}$ is less than or equal to hv. That is, for the situation where the temperature to which the plasma is heated does not exceed a maximum value, $T_{max}$. The relationship, $kT_{max}$=hv is the condition where the energy contained in the photon emitters represented by hv, Planck's constant times frequency, is equal to the energy contained in the expression $kT_{max}$ where k is the Stefan-Boltzmann constant. Where T is in units of absolute temperature (°K., degrees Kelvin), k is the Stefan-Boltzmann constant ($1.3807 \times 10^{-16}$ erg/°K.), h is Planck's constant ($6.626 \times 10^{-27}$ erg-second), and v is plasma photon frequency (1/second, (Second)$^{-1}$). Note that in hv, $v=c/\lambda$, where c is the speed of light ($3 \times 10^{10}$ cm/sec) and $\lambda$ is wavelength in cm (centimeters).

In the condition where $kT_{max}$ is less than or equal to hv, the profiles of laser pulse, x-ray emission, and plasma temperature roughly correspond and are roughly proportional to the change in plasma temperature. (See profiles labelled A & A') When $T_{max}$ is too high, the expression $kT_{max}$ becomes greater than hv and in that situation the profiles of laser pulse and x-ray emission do not correspond and are not roughly proportional. (See profiles labelled B & B') In other words, for some applications, it is undesirable to operate in the region where $kT_{max}$ is greater than hv. Referring to FIG. 13, a curve of laser pulse profile is shown and has a duration of $\tau_1$. Under optimized conditions, this laser pulse creates a temperature profile designated as profile A which has a profile that roughly corresponds to the laser pulse profile when the condition $kT_{max}$ is less than or equal to hv. Under this condition, the x-ray emission profile curve designated as A' has a pulse duration $\tau pa$ which is greater than $\tau_1$, and the x-ray emission profile roughly follows the temperature profile designated as A. When $kT_{max}$ is greater than hv, the temperature profile follows the dashed curve designated as B and the x-ray emission profile follows the curve designated as B' having a duration of $\tau p_b$. In this case, the temperature profile is very broad and the duration of the x-ray emission is also very broad.

Figure 14:
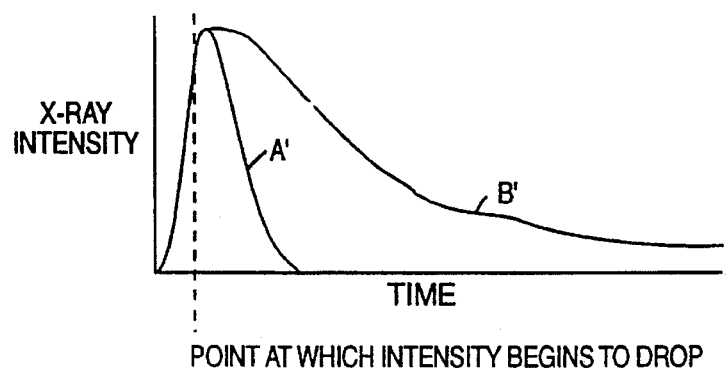
Figure 15:
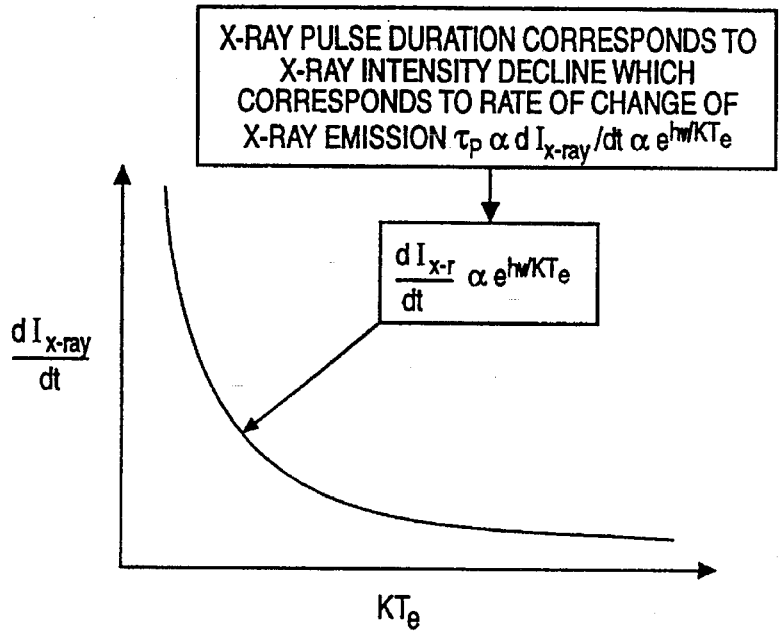
FIG. 15 shows a curve of rate of change of x-ray emission energy $dE_p/dt$, proportional to $dI_{xray}/dt$, versus $kT_c$, where I is x-ray intensity, t is time, $T_c$ is electron plasma temperature, and k is Stefan-Boltzmann constant; $E_p$ is energy, $I_{xray}$ is energy/second over area (intensity); $E_p$ is the total number of x-ray photons emitted times the energy of each photon.

FIGS. 13 and 14 are related to FIG. 15. In FIG. 15, the vertical axis shows the rate of change of x-ray photon energy (i.e., $d_{xray}^{Ep}/dt$, ergs/sec) and the horizontal axis represents plasma electron temperature expressed as $kT_c$. Note that $dI_{xray}/dt$ is proportional to hv/kT, where $I_{xray}$ is the x-ray intensity (x-ray photons)/(sec/cm$^2$), and t is time. The rate of change of x-ray emission, the rate at which intensity drops, will determine the x-ray pulse duration. For a large rate of change of x-ray emission, that is for relatively low values of kT, the x-ray intensity drops rather quickly and $T_p$ approaches $T_1$, per FIG. 14 curve A'. For a small rate of change of emission, for relatively high values of kT, x-ray intensity drops off slowly and the profile of T, does not correspond to $T_1$, per curve B'. The breakpoint in FIG. 15, where hv is approximately equal to $kT_{max}$, represents the point where temperatures greater than this $T_{max}$ cause the rate of change of x-ray emission to be relatively less sensitive to changes in kT. At plasma temperatures less than $T_{max}$, the rate of change of x-ray emission is relatively more sensitive to temperature changes. As can be seen with reference to FIG. 14, the characteristic behavior is for the falling x-ray intensity, as the rise is determined by the laser pulse and is relatively fast for all values of laser intensity of the plasma.

Accordingly, the curve of rate of change of x-ray emission versus electron temperature is defined for x-ray emission for a particular energy of hv. The point at which hv=kT represents a threshold above which the rate of change of x-ray emission ($dE_p/dt$ or $dI_{xray}/dt$) becomes insensitive to changes in electron temperature. (Here $dE_p/dt$ describes rate of change of the number of photons, and $E_p$ corresponds to number of photons times energy of a photon, hv; and I describes intensity.) This region represents long x-ray pulse duration, with respect to the laser pulse duration. Below this threshold the change in x-ray emission becomes very sensitive to changes in electron temperature, with x-ray pulse durations approaching the laser pulse duration. One may choose a temperature on this curve. If this temperature is greater than the threshold temperature, x-ray pulse duration will be long and insensitive to changes in temperature. To minimize x-ray pulse duration, the temperature should be selected such that it is below the threshold temperature.

The factors involved in controlling the x-ray pulse duration, described above, involve plasma conditions locally, where the x-rays originated. However, due to finite plasma size, a detector external to the plasma will integrate the contributions from each local region along the radiation propagation path. Thus, absorption, reemission, escape, stimulated emission and Doppler shifts must also be considered, which, by coupling the radiation from separate regions, makes the problem a global one. The temporal and spectral characteristics of the observed x-ray emission are determined by the complex interplay between these global effects and local plasma conditions. Since these effects are both time and space dependent, the complexity of the problem is well suited to detailed numerical analysis. It has been determined that the results of modeling the AlXI 2p–3d x-ray pulse duration with a one dimensional hydrodynamics code, coupled to a time dependent detailed configuration atomic physics package are in qualitative agreement with the trends that are both predicted by the simple collisional model and observed experimentally in this study. The experimental results reported in these Examples are useful both for experimentalists, and for many applications.

Figure 16:
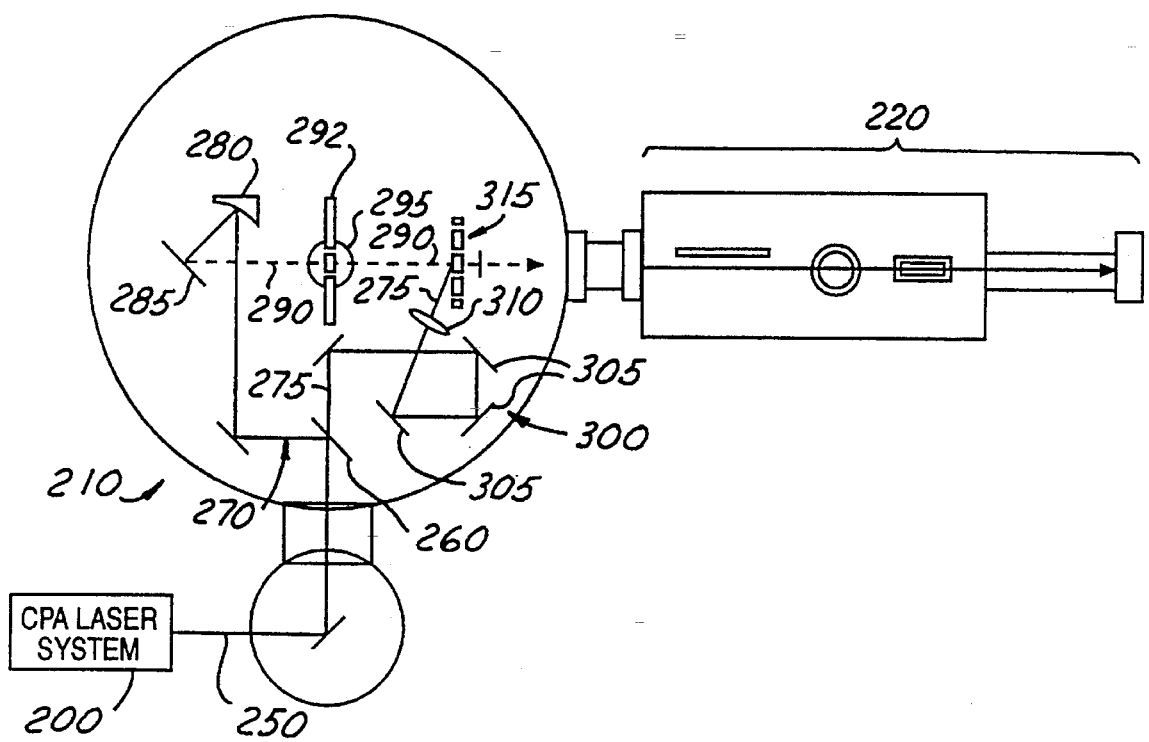
FIG. 16 shows an experimental set up for a pump/probe system for extended x-ray absorption fine structure (EXAFS) based on the principles of Examples I and II.

The novel ultrafast broadband tunable radiation source disclosed above is operable in the x-ray region of the electromagnetic spectrum for time resolved dynamic studies in ultrafast science. It represents a significant improvement over previous x-ray sources limited to very narrow parts of the electromagnetic spectrum. The new x-ray, "white light" source of the invention, permits the range of ultrafast absorption spectroscopy and imaging to be extended to a higher photon energy regime. Examples of applications include material structural dynamics, such as melting, chemical reaction, and importantly time resolved absorption spectroscopy of either quantum controlled photo initiated chemical reactions or transient energy states of laser ablated material. An example of an application for time resolved analysis is shown in FIG. 16 which contains a diagram of x-ray absorption spectroscopy apparatus and more particularly extended x-ray absorption fine structure (EXAFS). The major components of the system are laser apparatus (200), vacuum target chamber (210), and x-ray spectrometer (220). Laser system (200) is preferably a chirped pulse amplification system. This CPA system (200) is the same as that used in the Examples described above. The basic configuration of a CPA system used in the invention will be described more particularly below. The beam of laser light (250) generated from CPA laser (200) is split by mirror (260) into a first pulse (270) which is also referred to as a probe pulse and a second pulse (275) which is referred to as a pump pulse. Probe pulse (270) is directed by optical element (280), a parabolic reflective surface, onto first target (285). The reflective surface is a metal coated curved surface, preferably gold. The probe pulse (270) causes a plasma to be emitted from first target (285) and such plasma comprises a number of photon emitters referred to as x-ray radiation. The x-rays (290) travel along the path of the dotted line shown in FIG. 16 and then pass through keV baffle (292) and x-ray optic (295) which is any optical element capable of focusing or imaging x-rays. For soft x-rays, this generally consists of reflective, metal coated optics oriented at very small angles with respect to the x-ray propagation. Meanwhile, pump pulse (275) is directed through a delay line (300) which is composed of a number of reflective surfaces (305) and then focused by lens (320). Probe pulse (270) may arrive at sample (315), at the same time as x-ray pulse (290). Alternatively, the two pulses (270), (290) may be offset with respect to one another, one being ahead of the other, or they may overlap. In short, the pulses (275), (290) may be synchronous, or one delayed with respect to the other.

In the method of the invention, laser pulses are used having laser pulse width in the nanosecond to femtosecond range using a chirped pulse amplification (CPA) laser system. The basic configuration of such a CPA system is described in U.S. Pat. No. 5,235,606. U.S. Pat. No. 5,235,606 is incorporated herein by reference in its entirety. Chirped pulse amplification systems can be roughly divided into four categories. The first includes the high energy low repetition systems such as ND:glass lasers with outputs of several joules but they may fire less than 1 shot per minute. A second category are lasers that have an output of approximately 1 joule and repetition rates from 1 to 20 hertz. The third group consists of millijoule level lasers that operate at rates ranging from 1 to 10 kilohertz. A fourth group of lasers operates at 250 to 350 kilohertz and produces a 1 to 2 microjoules per pulse. In 5,235,606 several solid state amplifying materials are identified and the invention of 5,235,606 is illustrated using the Alexandrite. Ti:Sapphire is also commonly used in the basic process of 5,235,606 with some variations as described below. Other laser means include glass, LiSAF, dyes, LiCAF, and the like.

The illustrative examples described below generally pertain to pulse energies in the 0.1 joule (J) to 100 joule range with pulse width in the range of 50 fs (femtoseconds) to 50 ps (picoseconds) and the wave length on the order of 1 micron (μm). But these examples are merely illustrative and the invention is not limited thereby.

Figure 17:
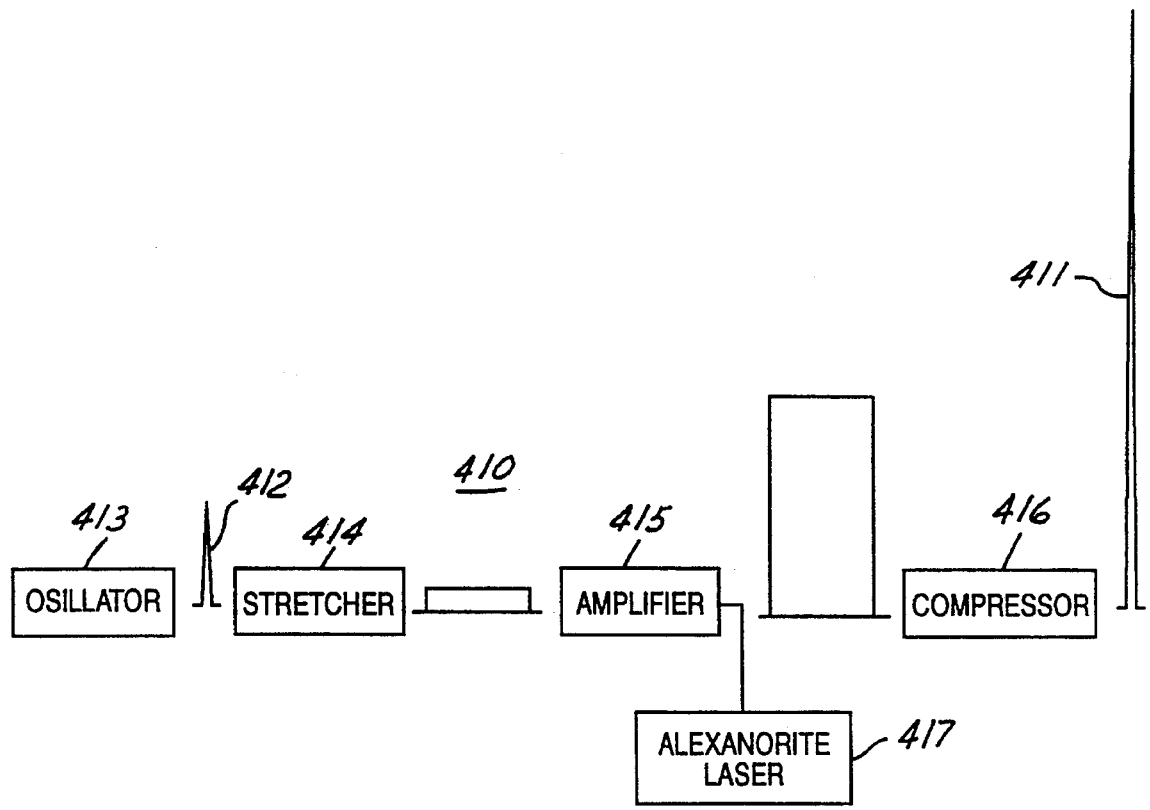
FIG. 17 is a schematic representative of a chirped pulse amplification arrangement.

In a basic scheme for CPA laser (410) of FIG. 17, an ultrahigh peak power pulse (411) is produced. First a short pulse (412) is generated. Ideally the pulse (412) from the oscillator (413) iS sufficiently short so that further pulse compression is not necessary. After the pulse is produced it is stretched in a stretcher comprising mirrors (414) and gratings arranged to provide positive group velocity dispersion. The amount the pulse is stretched depends on the amount of amplification. A first stage of amplification typically takes place in either a regenerative or a multipass amplifier (415) which is pumped by laser (417). In one configuration this consists of an optical resonator that contains the gain media, a Pockels cell, and a thin film polarizer. After the regenerative amplification stage the pulse can either be recompressed or further amplified. The compressor (416) consists of a grating or grating pair arranged to provide negative group velocity dispersion. Gratings used in the compressor are designed, constructed, and arranged to correspond to those in the stretching stage. More particulars of a typical system are described in U.S. Pat. No. 5,235,606, previously incorporated herein by reference.

To summarize, the invention provides a method whereby the pulse width of a given range of photon energies of continuum soft x-rays may be minimized by adjusting the laser focal spot size, and thereby the incident laser intensity, such that $T_c \leq T_{max}$. The results are found to be in qualitative agreement with the predictions of the hydrodynamics code coupled to the atomic physics model only when NLTE effects are included. The conversion efficiency of the high contrast subpicosecond laser pulses into keV x-ray pulses can be as high as a few tenths of a percent. The emission from gold targets in the x-ray region of 50 Å (Angstrom) is an order of magnitude brighter than the emission from the aluminum due both to its shorter pulse duration and higher x-ray yield.

Accordingly, the pulse duration of laser produced soft x-rays emitted from solid targets can be controlled, permitting a reduction in duration to as short as a few picoseconds. To enable this control, only a single parameter must be adjusted, namely, the intensity of the high contrast ultrashort laser pulse (400 fs (femtoseconds)). These results are found to be in qualitative agreement with a simple model of radiation from a collisionally dominated atomic system.

Short pulse broadband emission is observed only when the laser has both a high laser intensity contrast (no prepulse) and an appropriate intensity. One novel feature of this invention is that the x-ray pulse width can be controlled by simply adjusting a single parameter, the laser intensity, I. This controls the peak electron temperature relative to the ionization potential, corresponding to the emitted x-ray photon energy of interest. In order to maximize the total x-ray flux, the total number of x-ray emitters should also be maximized. This can be done by maximizing both the plasma density and the radial dimensions of the region over which the optimal ionization conditions exist. The former means that the shortest laser pulse should be used, in order to increase the direct deposition of laser energy at solid density. In order to maximize the radial dimensions of the region over which the optimal ionization conditions exist, we demonstrate that the laser spot size should be maximized, but, of course, in such a way that the peak laser intensity will be equal to its optimal value for the laser energy available.

The novel ultrafast broadband tunable radiation source in the x-ray region of the electromagnetic spectrum permits time resolved dynamical studies in ultrafast science. It was measured to be six orders of magnitude brighter, and three orders of magnitude shorter in pulse duration ($\leq$ one picosecond), than any existing synchrotron source. By virtue of being table top and relative inexpensive, it is also more readily available to a wider research community. And, since the x-rays are absolutely synchronized to the laser that produced them, they have the additional advantage of being capable of being used for jitter free pump/probe measurements of photoinduced processes. As such, this source could have enormous potential impact on research of ultrafast dynamics in the fields of physics, chemistry, and biology.

This source represents a significant improvement over previous ones for the following reasons. With this new x-ray "white light" source, the range of ultrafast absorption spectroscopy and imaging can now be extended to a higher photon energy regime. The source is essentially tunable in wavelength since a portion of the spectrum may be selected by use of either a multilayer mirror or a dispersive optic, such as a grating or Bragg crystal. Examples of applications include: material structural dynamics such as melting, temporal back lighting of dense plasmas, imaging of live biological cells, time resolved absorption spectroscopy of either quantum controlled photo initiated chemical reactions or transient energy states of laser ablated materials (for material processing and thin-film disposition), photosynthesis dynamics, photo electron spectroscopy (for condensed matter surface studies), inner shell atomic ionization, and nonlinear optics with x-rays.

The x-ray source employs the latest innovation in compact, ultrahigh power laser technology, specifically chirped pulse amplification. The CPA, $T^3$ (table top terawatt) lasers are capable of producing multi-terawatt, subpicosecond laser pulses in a compact (table top), inexpensive (hundreds of thousands of dollars) system. Such laser systems are ideal drivers for this novel x-ray radiation source. In a CPA system, a subpicosecond pulse is stretched to about a nanosecond in duration, amplified to high energy, and then recompressed, thus producing an ultrahigh power, subpicosecond pulse. Hence, CPA systems provide a very compact, inexpensive driver for this x-ray radiation source.

While this invention has been described in terms of certain embodiments thereof, it is not intended that it be limited to the above description, but rather only to the extent set forth in the following claims.

The embodiments of the invention in which an exclusive property or privilege is claimed are defined in the following claims.

What is claimed:

1. A method for generating x-rays which comprises controlling pulse time duration of x-rays emitted from plasma-forming matter, said x-rays obtained by bombarding said matter with a laser beam to produce a plasma from which said x-rays are emitted, said method comprising the steps of:
   a. generating a beam of one or more laser pulses;
   b. adjusting the intensity of said laser pulse to obtain a desired intensity incident at a surface of said plasma-forming matter; and
   c. directing said pulse onto said surface of said plasma-forming matter to generate said x-rays having pulse time duration which changes in proportion to a change in said incident laser pulse intensity.

2. The method according to claim 1 wherein said laser beam defines a spot size at said incident surface and the change in laser intensity is obtained by changing the laser spot size.

3. The method according to claim 2 wherein said laser pulse is generated by laser generating means, a laser focusing element is disposed between said laser generating means and said plasma-forming matter, and the change in the spot size is obtained by changing the relative positions of said laser focusing element and said plasma-forming matter, whereby the intensity changes inversely with the spot size.

4. The method according to claim 2 wherein said x-ray pulse duration is reduced proportionately with intensity by increasing the laser spot size.

5. The method according to any one of claims 2, 3, and 4 wherein the intensity changes inversely with the square of spot size, $\pi r^2$ where r is the radius of the spot size.

6. The method according to claim 2 wherein said x-rays have a pulse duration which is controlled by heating said plasma-forming matter to obtain a plasma electron temperature which is less than a maximum temperature ($T_{max}$) defined by: $kT_{max}=h\nu$, where T is in units of absolute temperature (°K., degrees Kelvin), k is the Stefan-Boltzmann constant ($1.3807 \times 10^{-16}$ erg/°K.), h is Planck's constant ($6.626 \times 10^{-27}$ erg-second), and $\nu$ is plasma photon frequency (1/second, (Second)$^{-1}$).

7. The method according to claim 1 wherein before step (b) the generated pulse is split into 2 or more pulses, a first pulse which follows said steps (b) and (c) of claim 1, and then is directed onto a sample target; and a second pulse which is directed onto said sample target.

8. The method according to claim 7 wherein one of said pulses arrives at said sample target before, during, or after the other one of said pulses.

9. The method according to claim 1 wherein before step (b) the generated pulse is split into 2 or more pulses, a first pulse which follows said steps (b) and (c) of claim 1, and then is directed onto a sample target; and a second pulse which is directed through one or more optic devices which delays said second pulse and directs said second pulse onto said sample target, thereby adjusting the arrival time of said second pulse at said sample target relative to said first pulse.

10. The method according to claim 9 wherein said second pulse arrives at said sample target before said first pulse.

11. The method according to claim 9 wherein said second pulse arrives at said sample target after said first pulse.

12. The method according to claim 9 wherein said second pulse arrives at said sample target during said first pulse.

13. The method according to claim 1 wherein steps (a) and (b) are conducted essentially simultaneously by adjusting the energy of the laser pulse according to the relationship $I=E/(t)(A)$ where I is intensity, E is energy, A is the area of the spot defined by the beam incident at said plasma-forming matter, and t is the time duration of the laser pulse, whereby intensity changes in proportion to energy.

14. The method according to claim 1 wherein steps (a) and (b) are conducted essentially simultaneously by adjusting the time duration of the laser pulse according to the relationship $I=E/(t)(A)$ where I is intensity, E is energy, A is the area of the spot defined by the beam incident at said plasma-forming matter, and t is the time duration of the laser pulse, whereby intensity changes inversely with time duration.

15. A method for generating x-rays which comprises controlling pulse time duration of x-rays emitted from plasma-forming matter at a desired wavelength corresponding to x-ray emission energy, said x-rays obtained by bombarding said matter with a laser beam having an incident intensity which heats said matter to a temperature sufficient to produce a plasma from which said x-rays are emitted, said matter being characterized by a relationship of rate of change of plasma x-ray emission energy versus plasma temperature ($T_p$) that includes a breakpoint temperature where there is a rapid and distinct change in the rate of change of x-ray emission energy with respect to plasma temperature, said method comprising the steps of generating a beam of one or more laser pulses in which each pulse has an incident intensity which produces a plasma temperature ($T_p$) not greater than said breakpoint temperature; and focusing said beam onto said matter.

16. A method for generating x-rays emitted from plasma-forming matter at a desired wavelength corresponding to x-ray emission energy, hv, where $v=c/\lambda$, c is the speed of light and $\lambda$ is the wavelength in centimeters, said x-rays obtained by bombarding said matter with a laser beam having an incident intensity which heats said matter to a temperature sufficient to produce a plasma from which said x-rays are emitted, said matter being characterized by a relationship of plasma x-ray emission energy versus plasma temperature ($T_p$) that includes an identifiable temperature ($T_{max}$), said method comprising controlling pulse time duration of said x-rays by heating said plasma-forming matter to obtain a plasma electron temperature ($T_p$) which is less than said identifiable temperature ($T_{max}$) defined by: $kT_{max}=hv$, where T is in units of absolute temperature (°K., degrees Kelvin), k is the Stefan-Boltzmann constant ($1.3807\times10^{-16}$ erg/°K.), h is Planck's constant ($6.626\times10^{-27}$ erg-second), and v is plasma photon frequency (1/second, (Second)$^{-1}$), said method further comprising the steps of generating a beam of one or more laser pulses in which each pulse has an incident intensity which produces a plasma temperature ($T_p$) not greater than said identified temperature ($T_{max}$); and focusing said beam onto said matter.

17. The method according to claim 15 or 16 wherein the laser beam defines a spot and said plasma temperature ($T_p$) is obtained by adjusting the size of said spot.

18. A method, for controlling pulse duration of x-rays emitted from a plasma-forming material by bombarding said material with a laser beam, which comprises:

a. determining, for a plasma-forming material, a rate of change of plasma x-ray emission energy versus plasma temperature and the proportionality between said rate of change and pulse duration of said x-rays;

b. selecting a value for x-ray pulse duration;

c. selecting a plasma temperature which produces said rate of change of x-ray emission energy temperature corresponding to the selected x-ray pulse duration;

d. generating a beam of one or more laser pulses having a laser intensity incident at or on said plasma-forming material which corresponds to said selected temperature; and e. directing said beam onto said plasma-forming material to produce said x-ray emission having a pulse duration corresponding to said determined temperature.

19. The method according to claim 18 wherein step (c) is conducted by determining a maximum plasma temperature value ($T_{max}$) according to $kT_{max}=hv$, where T is in units of absolute temperature (°K., degrees Kelvin), k is the Stefan-Boltzmann constant ($1.3807\times10^{-16}$ erg/°K.) h is Planck's constant ($6.626\times10^{-27}$ erg-second), and v is plasma photon frequency (1/second, (Second)$^{-1}$); and selecting a temperature which is not greater than said maximum temperature ($T_{max}$); whereby said x-ray pulse duration is less than that obtained when said selected temperature is greater than $T_{max}$.

20. The method according to claim 18 wherein step (c) is conducted by determining a curve of rate of change of plasma x-ray emission energy versus plasma temperature ($T_p$), determining a breakpoint temperature ($T_{max}$) on said curve where there is a rapid and distinct change in the rate of change of x-ray emission energy with respect to plasma temperature, and selecting a temperature which is not greater than said breakpoint temperature ($T_{max}$) whereby said x-ray pulse duration is less than that obtained when said selected temperature is greater than $T_{max}$.

21. The method according to any one of claims 1, 15, 16 and 18 wherein said beam is obtained by chirped-pulse amplification (CPA) means comprising means for generating a laser pulse; means for stretching such laser pulse in time; means for amplifying such time-stretched laser pulse including solid state amplifying media; and means for recompressing such amplified pulse to provide laser pulse duration of less than a picosecond, and laser pulse intensity sufficient to heat said plasma to said selected temperature.

22. The method according to claim 18 wherein the material is a solid material or a liquid material, the laser pulse time duration (t) is less than a picosecond; the laser beam has an intensity sufficient to heat said plasma to said selected temperature where ionization of the material causes said x-ray emission.

23. The method according to claim 18 wherein the laser pulse time duration (t) is less than a picosecond.

24. The method according to claim 18 wherein the laser beam has an intensity greater than about $10^{15}$ W/cm$^2$ (watts per square centimeter).

25. An apparatus for generating x-rays from a plasma comprising:

a. a vacuum chamber;

b. laser pulse generating means for generating a beam of one or more laser pulses;

c. first and second targets supported in said chamber;

d. said first target comprising matter which forms a plasma from which x-rays are emitted upon bombardment by one or more laser pulses;

e. beam splitting means which splits a laser pulse into two pulses, a first laser pulse and a second laser pulse;

f. optical means which delays the second laser pulse and directs it to said second target;

g. laser focusing means, disposed between said laser generating means and said first target, which focuses the first laser pulse onto said first target and adjusts the size of the spot of the beam and its corresponding intensity incident at said first target to produce a pulse of x-rays;

h. said first and second targets arranged in said chamber to define between them a path for the pulse of x-rays; and i. said optical means and second target arranged in said chamber to define between them a path for the second laser pulse.

26. The apparatus according to claim 25 wherein said laser pulse generating means comprises a chirped pulse amplification (CPA) system.

27. The apparatus according to claim 26 wherein said CPA system comprises means for generating an optical pulse, means for stretching the pulse in time, means for amplifying the time stretched pulse, and means for recompressing the amplified pulse providing high power pulses having a pulse duration of less than a picosecond.

28. The apparatus of claim 25 wherein said laser produces a beam of one or more pulses having an incident intensity of at least about $10^{10}$ watts per square centimeter.

29. The apparatus according to claim 25 wherein said beam splitting means comprises a transparent substrate with a reflective coating that produces partial transmission.

30. The apparatus of claim 25 wherein said optical means for directing said second pulse comprises a mirror, a lens, or both.

31. The apparatus of claim 25 wherein said laser focusing means comprises reflective or transmissive optical devices.

32. The apparatus according to claim 31 wherein said device has a parabolic surface which comprises a reflective metal.

33. The apparatus according to claim 25 wherein said first target comprises a solid material.

34. The apparatus according to claim 25 wherein said second target comprises a solid, liquid, or gas.

* * * * *